Jan. 8, 1957  S. W. DICKEY  2,776,495
LEVELING INSTRUMENT

Filed June 23, 1953  2 Sheets-Sheet 1

INVENTOR
Stanley W. Dickey
BY Rockwell & Bartholow
ATTORNEYS

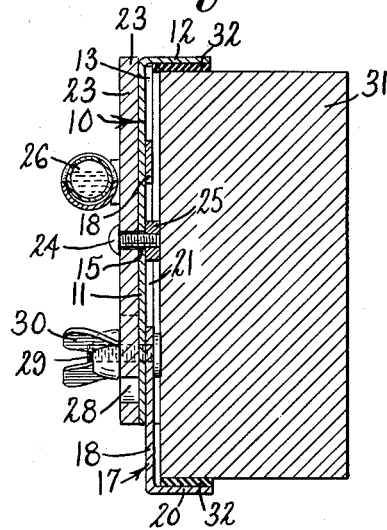
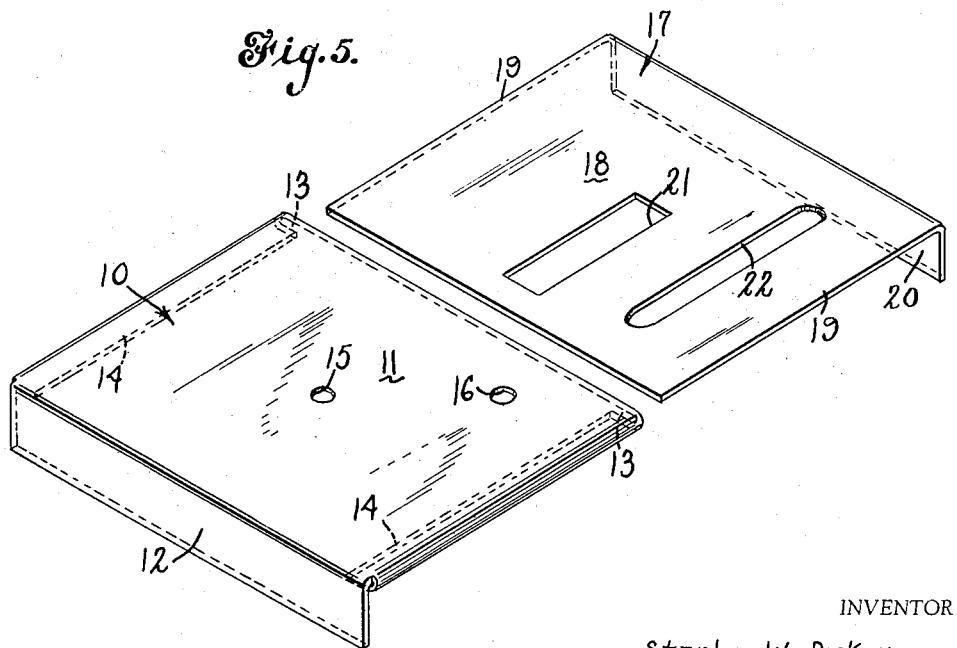

United States Patent Office 2,776,495
Patented Jan. 8, 1957

2,776,495
LEVELING INSTRUMENT

Stanley W. Dickey, North Haven, Conn., assignor, by mesne assignments, to Rite Hardware Company, Incorporated, North Haven, Conn., a corporation of Connecticut Application June 23, 1953, Serial No. 363,484

3 Claims. (Cl. 33—207)

This invention relates to leveling instruments and relates more particularly to leveling instruments of the type which may be used to indicate either a horizontal or plumb line. Instruments of this type are commonly used in many kinds of construction work.

One object of the invention is to provide a leveling instrument with improved means for releasably securing a work piece to the instrument.

Another object of the invention is to provide a leveling instrument, as characterized above, having adjustable securing means whereby the instrument may be secured to work pieces of varying widths.

Still another object of the invention is to provide a leveling instrument having few and simple parts, which instrument is very satisfactory in use, and which instrument may be produced at low cost.

In the drawings:

Fig. 4 is a sectional view taken on line 4—4 of Fig. 2; and

Fig. 5 is an exploded view of the base plate and flange member of the leveling instrument.

Figure 1:
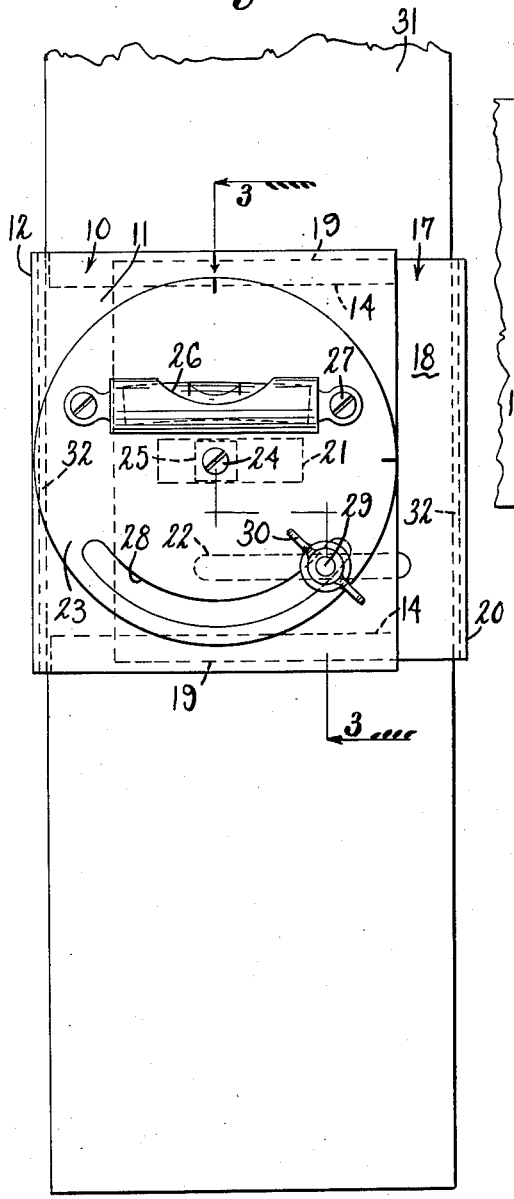
Fig. 1 is an elevational view illustrating a leveling instrument embodying the invention and showing the instrument secured to a vertically disposed work piece.

In the drawings, the numeral 10 indicates the base plate of the leveling instrument, the base plate 10 having a rectangular body portion 11 and a flange portion 12 at one side of the body portion 11 and disposed at right angles with respect thereto. A pair of guideways or opposing channels 13 are provided on the base plate 10 at opposite sides of the body portion 11, the guideways or channels 13 being formed preferably by edge portions 14 of the base plate 10, which edge portions are bent, as illustrated in Fig. 5, for example. The base plate 10 may be formed conveniently of sheet metal and is provided with an aperture 15 and an aperture 16, as illustrated, for example, in Fig. 5 of the drawings. A plate or flange member 17, also formed conveniently of sheet metal, and having a rectangular body portion 18 cooperates with the base plate 10, opposite edge portions 19 of the body part 18 being extensible into the channels 13 formed by the base plate 10, the flange member 17 being provided with a flange portion 20 disposed at right angles to the body portion 18 thereof opposite the flange portion 12 of the base plate 10, as illustrated, for example, in Fig. 4 of the drawings. The body portion 18 of the flange member 17 is provided with two elongated slots 21 and 22 which register, respectively, with the apertures 15 and 16 formed in the body portion 11 of the base plate 10.

Figure 3:
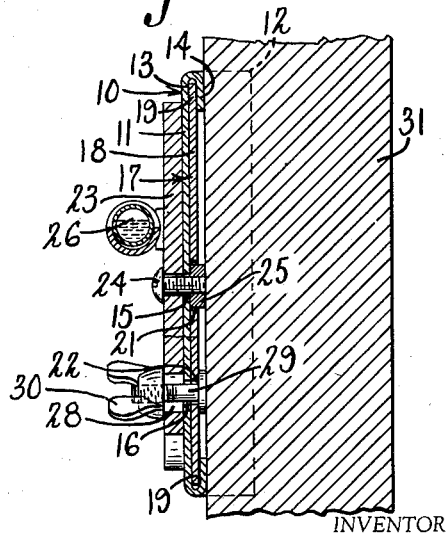
Fig. 3 is a sectional view taken on line 3—3 of Fig. 1.

A plate or disc, formed conveniently of sheet metal, is revolubly mounted on the body portion 11 of the base plate 10 at the face thereof remote from the flange member 17, the disc being indicated at 23, and the disc 23 being mounted on the base plate 10 by a bolt 24 extending through the center of the disc 23 and extending through the aperture 15 formed in the base plate 10, the bolt 24 also extending through the slot 21 formed in the flange member 17 and having a threaded connection with a nut 25 disposed and riding in the slot 21, the arrangement being such that the connection between the disc 23 and the base plate 10 permits sliding movement of the flange member 17 with respect to the base plate 10, which sliding movement may be limited by the ends of the slot 21 formed in the flange member 17 and presenting abutments engageable with the nut 25. A leveling device or conventional spirit tube 26 is carried by the disc 23 at the outer face thereof and is rigidly secured thereto, as at 27. The disc 23 is provided with an arcuately and concentrically formed slot, as at 28. A clamping bolt 29 having the head thereof engaging the face of the flange member 17 remote from the base plate 10, extends through the slot 22 formed in the flange member 17 and extends through the aperture 16 formed in the base plate 10. The bolt 29 also extends through the arcuate groove 28 formed in the disc 23 and has threaded engagement with a wing nut 30, the arrangement being such that the disc 23 may be angularly adjusted with respect to the base plate 10, the angular adjustment of the disc 23 being limited only by the ends of the arcuate slot 28 which present abutments engageable with the bolt 29. The wing nut 30 is engageable with the disc 23 and may be adjusted on the bolt 29 to clamp the base plate 10 to the disc 23 in any angularly adjusted position of the latter. In accordance with the invention, the bolt 29 and adjustable wing nut 30 also serve to clamp the base plate 10 to the flange member 17 in any extended or adjusted position of the latter with respect to the base plate 10, as illustrated, for example, in Figs. 3 and 4 of the drawings. As illustrated in Fig. 1 of the drawings, for example, the base plate 10 is provided with indicia cooperating with indicia provided on the disc 23 marking a 90° segment of the latter.

The leveling instrument of the invention is applied to a work piece such as the work piece indicated at 31, for example, by first adjusting the extensible flange member 17 with respect to the base plate 10 so that the flange portions 12 and 20 of the leveling instrument fit over opposite sides of the work piece 31 and are firmly engaged by the latter; then, if the work piece is to be disposed on a plumb line, the disc 23 is angularly adjusted with respect to the base plate 10 so the disc 23 is positioned as illustrated in Fig. 1 of the drawings. The wing nut 30 may then be tightened to clamp the base plate 10, the flange member 17 and the disc 23 in their relative adjusted positions. As illustrated in Fig. 1 of the drawings, the leveling instrument is firmly secured to the work piece 31. If desired, rubber or like strips of material 32 may be cemented or otherwise suitably secured to the opposing faces of the flange portions 12 and 20 of the instrument, as illustrated in Fig. 4 of the drawings, the strips 32 being adapted to abut the sides of the work piece 31. As illustrated in Fig. 1 of the drawings, the work piece 13 is plumb, as indicated conventionally by the position of the bubble in the spirit tube 26.

Figure 2:
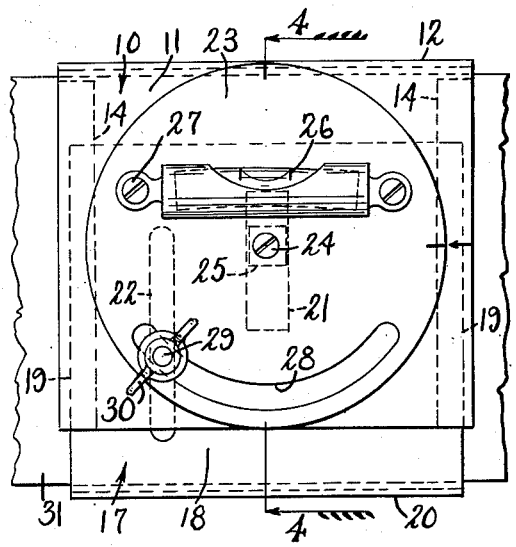
Fig. 2 is an elevational view illustrating the leveling instrument secured to the work piece and showing the latter in a horizontally disposed position.

If the work piece is to be disposed on a horizontal line, the base plate 10 and the disc 23 are angularly adjusted with respect to one another so that the disc 23 is positioned as illustrated in Fig. 2 of the drawings. The disc 23 may be angularly moved to the position illustrated in Fig. 2 from the position illustrated in Fig. 1 of the drawings by loosening the wing nut 30 and manually rotating the disc 90° to the left. The wing nut 30 may then be tightened to clamp the base plate 10 to the disc 23 in the adjusted position of the latter. It will be understood that the indicia provided on the base plate 10 and cooperating with the indicia on the disc 23 facilitate angular adjustment of the latter to predetermined positions thereof. As illustrated in Fig. 2 of the drawings, the work piece 31 is disposed on a horizontal line, as indicated conventionally by the position of the bubble in the spirit tube 26. To remove the leveling instrument from the work piece 31, the wing nut 30 is loosened and the flange portions 12 and 20 of the instrument are separated sufficiently to permit the instrument to be slipped from the work piece.

In accordance with the invention, the leveling instrument comprises a single spirit tube which may be angularly adjusted to indicate either a horizontal or plumb line. Also in accordance with the invention, the leveling instrument is provided with simple and effective means for securing the instrument to opposite sides of a work piece, the securing means being adjustable whereby the instrument may be secured to work pieces of varying widths. Another feature of the invention resides in the provision of a single and simple means for securing all of the parts of the instrument in their relative adjusted positions. Another feature of the invention resides in the provision of a leveling instrument having few and simple parts, which instrument is very satisfactory in use and which instrument may be produced at low cost.

While the preferred form of the invention has been described above and illustrated in the drawings, it will be understood that the invention may take other forms. For example, the flange member may be provided with guideways or opposing channels coacting with the base plate, and the flange member may be interposed between the disc and the base plate.

What I claim is:

1. In an instrument such as described, the combination of a base plate member having a body portion and a flange portion, an angularly adjustable disc having a spirit tube rigidly secured thereto, said disc being disposed adjacent the outer face of the body portion of said member and being revolubly mounted on said body portion, a flange member having a body portion disposed adjacent the inner face of the body portion of the base plate member, said flange member having a flange portion provided with an inner face in opposing relation to the inner face of the flange portion of the base plate member, one of said members being provided with guideways coacting with the other member, said flange member being extensible from said base plate member whereby said flange portions may be adjusted toward and away from each other, said flange portions being adapted to be secured to opposite sides of a work piece, and means extending through said members and cooperating with said disk to releasably clamp said members and said disc in their relative adjusted positions.

2. In an instrument such as described, the combination of a base plate member having a body portion and a flange portion, said body portion being provided with a first aperture and a second aperture, a flange member having a body portion and a flange portion, the body portion of the flange member having a first elongated slot and a second elongated slot formed therein, the body portion of the flange member being disposed adjacent one face of the body portion of the base plate and said first and second slots registering with said first and second apertures, respectively, a disc disposed adjacent the remote face of the base plate and having a spirit tube rigidly secured thereto, said disc having an arcuately and concentrically formed slot therein registering with said second aperture and said second slot, a fastener extending through the center of said disc and extending through said first aperture, said fastener also extending into said first slot and revolubly mounting said disc on said base plate, and means for clamping together said members and said disc and comprising a nut engageable with said disc and threaded on a bolt extending through said arcuately formed slot and extending through said second aperture and said second slot, said flange portions being disposed opposite each other and being adjustable toward and away from each other, said disc being angularly adjustable, and said means clamping said members and said disc in their relative adjusted positions.

3. In an instrument such as described, the combination of a base plate member having a body portion and a flange portion, an angularly adjustable disc having a spirit tube rigidly secured thereto, said disc being disposed adjacent the outer face of the body portion of said member and being revolubly mounted on said body portion, a flange member having a body portion disposed adjacent the inner face of the body portion of the base plate member, the last-mentioned member having a flange portion provided with an inner face in opposing relation to the inner face of the flange portion of the base plate member, the body portion of one of said members being provided with guideways coacting with the body portion of the other of said members and said members being extensible from one another whereby said flange portions may be adjusted toward and away from each other, said flange portions being adapted for clamping engagement with opposite sides of a work piece, said disc having an arcuately and concentrically formed slot therein, said flange member having a slot formed in the body portion thereof, and means extending through said base plate and said slots to releasably clamp together the adjustable members and said angularly adjustable disc.

References Cited in the file of this patent

UNITED STATES PATENTS

| | | |
|---|---|---|
| 1,456,431 | Frank | May 22, 1923 |
| 1,682,060 | Banks | Aug. 28, 1928 |
| 2,530,478 | Parent | Nov. 21, 1950 |